United States Patent
Cui et al.

(10) Patent No.: US 11,114,666 B2
(45) Date of Patent: Sep. 7, 2021

(54) MODIFIED GRAPHITE NEGATIVE ELECTRODE MATERIAL, PREPARATION METHOD THEREOF AND SECONDARY BATTERY

(71) Applicant: Ningde Amperex Technology Limited, Fujian (CN)

(72) Inventors: Hang Cui, Fujian (CN); Taiqiang Chen, Fujian (CN); Yuansen Xie, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 129 days.

(21) Appl. No.: 16/548,855

(22) Filed: Aug. 23, 2019

(65) Prior Publication Data

US 2020/0014028 A1 Jan. 9, 2020

Related U.S. Application Data

(63) Continuation of application No. PCT/CN2017/108907, filed on Nov. 1, 2017.

(30) Foreign Application Priority Data

Feb. 24, 2017 (CN) .......................... 201710102648.3

(51) Int. Cl.
| | |
|---|---|
| H01M 4/587 | (2010.01) |
| H01M 4/36 | (2006.01) |
| H01M 4/62 | (2006.01) |
| H01M 10/0525 | (2010.01) |
| H01M 10/0587 | (2010.01) |
| H01M 4/02 | (2006.01) |

(52) U.S. Cl.
CPC .......... *H01M 4/587* (2013.01); *H01M 4/364* (2013.01); *H01M 4/366* (2013.01); *H01M 4/622* (2013.01); *H01M 4/625* (2013.01); *H01M 10/0525* (2013.01); *H01M 10/0587* (2013.01); *H01M 2004/027* (2013.01)

(58) Field of Classification Search
CPC ...... H01M 4/364; H01M 4/366; H01M 4/587; H01M 4/622; H01M 4/625; H01M 2004/027
See application file for complete search history.

(56) References Cited

U.S. PATENT DOCUMENTS

| 9,764,955 | B2 * | 9/2017 | Al-Hazmi | ............... | C01B 32/23 |
|---|---|---|---|---|---|
| 2005/0271574 | A1 * | 12/2005 | Jang | ...................... | C01B 32/225 423/448 |
| 2011/0159372 | A1 * | 6/2011 | Zhamu | .................. | H01M 4/139 429/232 |
| 2013/0065034 | A1 * | 3/2013 | Muramatsu | ........... | C01B 32/194 428/213 |
| 2014/0023926 | A1 * | 1/2014 | Li | ........................... | H01M 4/13 429/213 |
| 2014/0332731 | A1 * | 11/2014 | Ma | .......................... | H01M 4/13 252/506 |
| 2015/0099169 | A1 * | 4/2015 | Dudney | ................ | H01M 4/366 429/217 |

FOREIGN PATENT DOCUMENTS

| CN | 105336923 | | 2/2016 |
|---|---|---|---|
| CN | 105703012 | A | 6/2016 |
| CN | 106058154 | A | 10/2016 |
| KR | 20130037964 | A * | 4/2013 |

OTHER PUBLICATIONS

EPO website (www.espacenet.com) machine translation of KR 20130037964A. (Year: 2013).*
EPO website (www.espacenet.com) machine translation of CN106058154A (Year: 2016).*
International Search Report of PCT Patent Application No. PCT/CN2017/108907 dated Jan. 26, 2018.

* cited by examiner

*Primary Examiner* — Gregg Cantelmo
(74) *Attorney, Agent, or Firm* — Taylor English Duma LLP

(57) ABSTRACT

The present invention provides a modified graphite negative electrode material, preparation method thereof and a secondary battery. The modified graphite negative electrode material includes a graphite and a multilayer graphene. The multilayer graphene are dispersed in the graphite. The multilayer graphene are loaded with a conductive agent by bonding of a binder. The modified graphite negative electrode material can achieve a higher compaction density for the negative electrode, and can effectively improve the lithium precipitation of the negative electrode of the secondary battery while improving the cycle performance of the secondary battery when being applied to the secondary battery.

14 Claims, 3 Drawing Sheets

MODIFIED GRAPHITE NEGATIVE ELECTRODE MATERIAL, PREPARATION METHOD THEREOF AND SECONDARY BATTERY

CROSS-REFERENCE TO RELATED APPLICATION

This application is a continuation application of PCT application No. PCT/CN2017/108907 filed on Nov. 1, 2017, which claims priority to and benefits of Chinese Patent Application Serial No. 201710102648.3, filed with the China National Intellectual Property Administration on Feb. 24, 2017. The entire content of the above applications is incorporated herein by reference.

FIELD OF THE APPLICATION

The present disclosure relates to the field of secondary battery, in particular, to a modified graphite negative electrode material, preparation method thereof and a secondary battery.

BACKGROUND OF THE APPLICATION

As the requirement for the energy density of secondary batteries is becoming higher and higher, the negative electrode material becomes a key factor in the development of secondary batteries with high energy density. Since the volume of the negative electrode accounts for 40% to 50% of the volume of the entire secondary battery, especially higher at a high energy density, increasing the compaction density of the negative electrode is an effective way to increase the energy density of the secondary battery. Increasing the compaction density of the negative electrode is advantageous for increasing the energy density of the secondary battery, but inevitably causes problems such as difficulty in electrolyte infiltration, increase in polarization, and deterioration of interface, which may result in deterioration of the kinetic performance and cycle performance of the secondary battery, e.g., the lithium is easily precipitated at the negative electrode at a high density and the capacity is attenuated rapidly after being circulated at room temperature.

The comprehensive performance of graphite negative electrode materials especially the cycle performance, is better, but increasing the compaction density of graphite is difficult because the rolling pressure of graphite has reached its limit. And also, at high compaction density, the interface between the negative electrode and the electrolyte is relatively poor, resulting in an increased risk of lithium precipitation of the negative electrode. A monolayer graphene has very good electrical conductivity, but its processing properties are poor. In the prior art, the simple mixing of graphene and graphite may cause the consistency of the secondary battery to be too poor as the difficulty in mixing uniformly with graphite caused by the characteristics of graphene itself, so that mass production may not be achieved.

SUMMARY OF THE APPLICATION

In view of the problems in the background art, the present disclosure aims at providing a modified graphite negative electrode material, preparation method thereof and a secondary battery. The modified graphite negative electrode material can achieve a higher compaction density for the negative electrode, and can effectively improve the lithium precipitation of the negative electrode of the secondary battery while improving the cycle performance of the secondary battery when being applied to the secondary battery.

In order to achieve the above object, in the first aspect of the present disclosure, the present disclosure provides a modified graphite negative electrode material, comprising a graphite and a multilayer graphene. The multilayer graphene dispersed in the graphite. The multilayer graphene are loaded with a conductive agent by bonding of a binder.

In the second aspect of the present disclosure, the present disclosure provides a preparation method of modified graphite negative electrode material for preparing the modified graphite negative electrode material according to the first aspect of the present invention, comprising steps of: adding a multilayer graphene, a conductive agent and a binder to a mechanical fusion machine under a protective gas atmosphere, setting a rotation speed and raising the temperature so that the multilayer graphene are loaded with the conductive agent by the bonding of the binder; adding the multilayer graphene loaded with the conductive agent and the graphite to a mixer for mixing, screening and demagnetizing after mixing, to obtain the modified graphite negative electrode material.

In the third aspect of the present disclosure, the present disclosure provides a secondary battery, comprising the modified graphite negative electrode material according to the first aspect of the present invention.

Compared with the prior art, the present invention has the following beneficial effects:

The modified graphite negative electrode material of the present disclosure may achieve a higher compaction density for the negative electrode, and can effectively improve the lithium precipitation of the negative electrode of the secondary battery while improving the cycle performance of the secondary battery when being applied to the secondary battery.

BRIEF DESCRIPTION OF THE ACCOMPANYING DRAWINGS

DETAILED DESCRIPTION OF THE PREFERRED EXAMPLES

Figure 1:
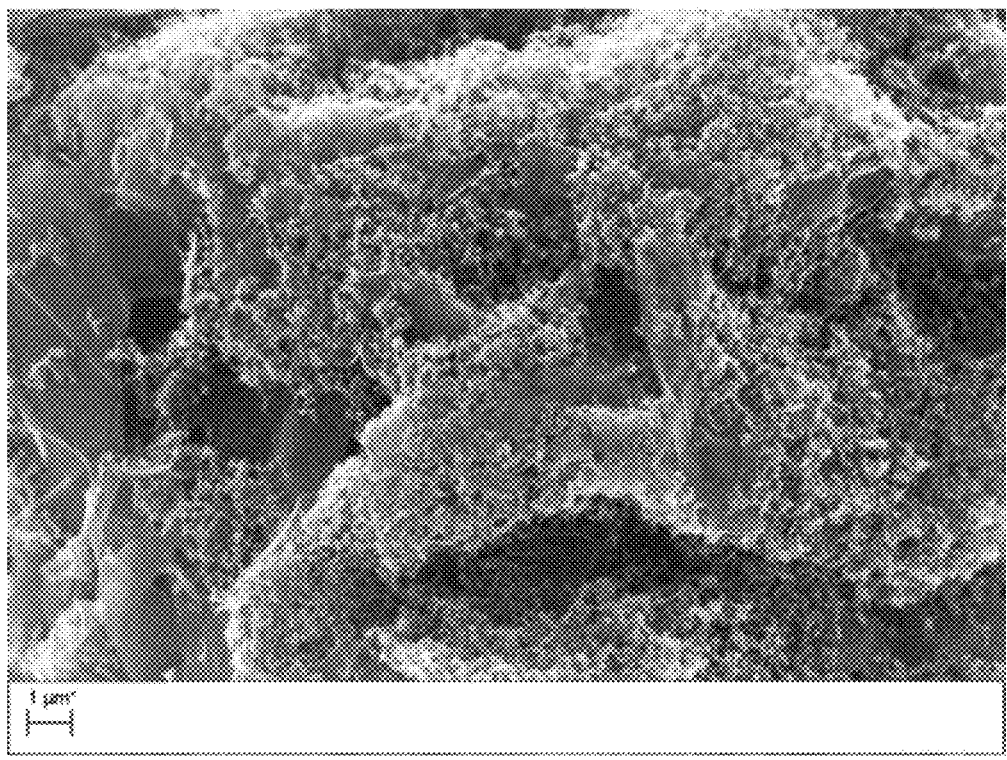
FIG. 1 is a FESEM graph of a multilayer graphene loaded with Super P™ prepared in Embodiment 1.

The modified graphite negative electrode material, preparation method thereof and a secondary battery according to the present disclosure will be described in detail.

First, the modified graphite negative electrode material according to the first aspect of the present disclosure will be described.

The modified graphite negative electrode material according to the first aspect of the present invention includes graphite and a multilayer graphene. The multilayer graphene is dispersed in the graphite. The multilayer graphene is loaded with a conductive agent by bonding of a binder.

In the modified graphite negative electrode material according to the first aspect of the present disclosure, the multilayer graphene has very good lubricating effect, but its conductivity and electrolyte infiltration are general, and the multilayer graphene has many voids on the surface and inside, so as to adsorb or bond other substances. The conductive agent has a small particle size, a relatively large specific surface area, and excellent electrical conductivity and electrolyte infiltration (infiltration time of about 10 s). Therefore, loading the multilayer graphene with the conductive agent by bonding of a binder (such as the surface and the internal interlayer position of the multilayer graphene) may improve the conductivity and electrolyte infiltration of the multilayer graphene while reducing the surface energy of the multilayer graphene, so that the surface may form a large-area excellent lubricating membrane. When the multilayer graphene loaded with the conductive agent is mixed with graphite to obtain a modified graphite negative electrode material, the excellent lubricating effect of the multilayer graphene may greatly reduce the frictional resistance between the graphite particles during cold pressing, so that the graphite particles may be better slipped relative to each other to achieve a higher compaction density and avoid the problem of difficulty in processing a monolayer graphene. At the same time, rapid deintercalation of lithium may be achieved by using multilayer graphene, and the excellent conductivity and electrolyte infiltration of the conductive agent significantly reduce the risk of lithium precipitation of the negative electrode at high compaction density, and better maintain the excellent overall performance of the graphite negative electrode material, especially the cycle performance.

In the modified graphite negative electrode material according to the first aspect of the present disclosure, the multilayer graphene have a true density of 1.8 g/cm³ to 2.15 g/cm³. The multilayer graphene with this true density has a very good lubricating effect, and may reduce the frictional resistance between the graphite particles during cold pressing and compaction, so that the graphite particles may be optimally stacked, thereby increasing the compaction density of the negative electrode. If the true density of the multilayer graphene is further increased or decreased, the good lubricity of the graphene disappears, and the processing property of the multilayer graphene deteriorates, resulting in large fluctuation of the viscosity of the negative electrode slurry, and incapability to perform coating or difficulty in dispersing graphene in the negative electrode slurry, which causes large fluctuation of capacity of the secondary battery, and difficulty in achieving mass production.

In the modified graphite negative electrode material according to the first aspect of the present disclosure, the multilayer graphene have a layer number of 10 to 20. The multilayer graphene having this layer number has a good lubricating effect and a low specific surface area (BET) (usually BET <40 m²/g). The number of layers of graphene used in the prior art is usually less than 10. Although this graphene has good conductivity and high capacity, the specific surface area is sharply increased, resulting in an increase in irreversible capacity loss of the secondary battery. And, self-agglomeration phenomenon of graphene is significantly increased due to the large specific surface area, resulting in processing difficulties, causing large fluctuation of the viscosity of the negative electrode slurry, and incapability to perform coating or difficulty in dispersing graphene in the negative electrode slurry, which causes large fluctuation of capacity of the secondary battery, and difficulty in achieving mass production. Preferably, the multilayer graphene may have a layer number of 10 to 15.

In the modified graphite negative electrode material according to the first aspect of the present disclosure, the conductive agent may include one or more of a carbon black conductive agent and a graphite conductive agent. Preferably, the conductive agent may be selected from one or more of Super-P™, Super S™, acetylene Black™, 350G, carbon fiber, carbon nanotube, Ketjen Black™, KS-6™, KS-15™, SFG-6™, SFG-15™.

In the modified graphite negative electrode material according to the first aspect of the present disclosure, the binder may be selected from one or more of asphalt, phenolic resin, polyurethane, polystyrene resin, polyacrylate, and ethylene-vinyl acetate copolymer.

In the modified graphite negative electrode material according to the first aspect of the present disclosure, a mass ratio of the graphite to the multilayer graphene may be: (99.9% to 85%):(0.1% to 15%). If the content of the multilayer graphene is too high, the first efficiency of the secondary battery is low, and the capacity is low, thereby affecting the energy density of the secondary battery. In addition, if the content of the multilayer graphene is too high, the dispersibility of the negative electrode slurry may be deteriorated, which may in turn affect the compaction density of the negative electrode, thereby easily causing lithium precipitation at the negative electrode and affecting the performance of the secondary battery. If the content of the multilayer graphene is too low, the conductivity and lubricity thereof are relatively poor, so that the improvement in the compaction density of the negative electrode is not remarkable.

In the modified graphite negative electrode material according to the first aspect of the present disclosure, a mass ratio of the conductive agent to the binder to the multilayer graphene may be: (10% to 40%):(5% to 40%):(20% to 80%). If the content of the conductive agent is too high, it is difficult for it to uniformly disperse on the surface of the multilayer graphene to exert effectively excellent lubricity of the multilayer graphene, thereby affecting the processing of the negative electrode, resulting in low compaction density of the negative electrode. If the content of the conductive agent is too low, the active sites of the surface of the multilayer graphene may not be uniformly covered by the conductive agent for effectively improving the conductivity and electrolyte infiltration of the multilayer graphene, which may cause a large amount of side reactions in the cycle, consumes a large amount of electrolyte, and eventually causes deterioration in the cycle performance of the secondary battery.

In the modified graphite negative electrode material according to the first aspect of the present disclosure, the graphite may be selected from artificial graphite and/or natural graphite.

In the modified graphite negative electrode material according to the first aspect of the present disclosure, the multilayer graphene may have a median diameter D50 of 6 μm to 24 μm. Since the multilayer graphene having a larger median diameter D50 has a low excellent synthesis rate, increasing the median diameter D50 of the multilayer graphene leads to an increase in processing cost. If the median diameter D50 of the multilayer graphene is low, a continuous conductive network may not be formed, thereby affecting the conductive effect. Further, the median diameter D50 of the multilayer graphene being too low or too high may affect the distribution of the multilayer graphene in the graphite particles, affect the compaction density of the negative electrode, and affect the dispersibility of the negative electrode slurry.

Second, the preparation method of the modified graphite negative electrode material according to the second aspect of the present invention will be described.

The preparation method of the modified graphite negative electrode material according to the second aspect of the present disclosure is used to prepare the modified graphite negative electrode material according to the first aspect of the present invention, and comprises steps of: (1) adding a multilayer graphene, a conductive agent and a binder to a reactor of a mechanical fusion machine under a protective gas atmosphere, setting a rotation speed and raising the temperature so that the multilayer graphene are loaded with the conductive agent by the bonding of the binder; (2) adding the multilayer graphene loaded with the conductive agent and the graphite to a mixer for mixing, screening and demagnetizing after mixing, to obtain the modified graphite negative electrode material.

In the preparation method of the modified graphite negative electrode material according to the second aspect of the present invention, the preparation process of the multilayer graphene used in the step (1) is adding a sheet-like graphene is to a mechanical fusion machine and setting the rotation speed for shaping and granulation to obtain a granular multilayer graphene, wherein the mechanical fusion machine may have a rotation speed of 300 r/min to 1200 r/min.

In the preparation method of the modified graphite negative electrode material according to the second aspect of the present invention, in step (1), the conductive agent is loaded onto the multilayer graphene by mechanical fusion. The principle is: each material rotates at high speed in the rotor, is pressed against the wall under the action of centrifugal force, and passes through between the rotor and the stator extrusion head at high speed; at this moment, the material is subjected to both the pressing force and the shearing force, and the material circulates back and forth between the rotor and the stator due to the high-speed rotation while being constantly subjected to the pressing force and the shearing force, thereby loading the conductive agent to the multilayer graphene.

In the preparation method of the modified graphite negative electrode material according to the second aspect of the present invention, the rotation speed in step (1) may be from 300 r/min to 1200 r/min, and the heating temperature is not limited as long as the selected binder is softened.

In the preparation method of the modified graphite negative electrode material according to the second aspect of the present disclosure, the rotation speed in step (2) may be from 100 r/min to 1200 r/min.

Third, the secondary battery according to the third aspect of the present disclosure will be described.

The secondary battery according to the third aspect of the present disclosure comprises the modified graphite negative electrode material according to the first aspect of the present invention.

In the secondary battery according to the third aspect of the present disclosure, the secondary battery comprises a positive electrode, a negative electrode, an separator, and an electrolyte. The separator is spaced between the positive electrode and the negative electrode. The positive electrode includes a positive current collector and a positive diaphragm disposed on the positive current collector, and the positive diaphragm includes a positive active material, a binder, and a conductive agent. The negative electrode includes a negative current collector and an negative diaphragm disposed on the negative current collector, and the negative diaphragm includes a negative active material, a binder, and may also include a conductive agent, wherein the negative active material may include the modified graphite negative electrode material according to the first aspect of the present invention.

In the secondary battery according to the third aspect of the present disclosure, the separator may be any separator material used in the existing secondary battery, such as polyethylene, polypropylene, polyvinylidene fluoride, and a plurality of layers of composite membrane thereof, but is not limited thereto.

In the secondary battery according to the third aspect of the present disclosure, the secondary battery may be a lithium ion secondary battery, a sodium ion secondary battery, or a zinc ion secondary battery.

When the secondary battery is a lithium ion secondary battery, the electrolyte salt may be selected from a lithium salt. The lithium salt may be selected from one or more of $LiPF_6$, $LiBF_4$, LiFSI, LiTFSI, $LiClO_4$, $LiAsF_6$, LiBOB, LiDFOB, $LiPO_2F_2$, LiTFOP, $LiN(SO_2RF)_2$, $LiN(SO_2F)(SO_2RF)$, wherein $RF=C_nF_{2n+1}$ indicating a saturated perfluoroalkyl group, and n is an integer within 1 to 10. Preferably, the lithium salt is $LiPF_6$.

When the secondary battery is a lithium ion secondary battery, the positive active material may be selected from one or more of lithium cobaltate ($LiCoO_2$), lithium nickelate ($LiNiO_2$), spinel $LiMn_2O_4$, olivine-type $LiMPO_4$, ternary positive material $LiNi_xA_yB_{(1-x-y)}O_2$, and $Li_{1-x}(A'_{y'}B'_{z'}C_{1-y'-z'})O_2$. Among which, in the olivine-type $LiMPO_4$, M is selected from one or more of Co, Ni, Fe, Mn, and V; in the ternary positive material $LiNi_xA_yB_{(1-x-y)}O_2$, A and B are each independently selected from one of Co, Al, and Mn, and A and B are not the same, 0<x<1, 0<y<1 and x+y<1; in the ternary positive material $Li_{1-x}(A'_{y'}B'_{z'}C_{1-y'-z'})O_2$, A', B', and C are each independently selected from one of Co, Ni, Fe, and Mn, 0<x'<1, 0≤y'<1, 0≤z'<1 and y'+z'<1, and A', B', C are not the same.

When the secondary battery is a lithium ion secondary battery, the negative active material may only be the modified graphite negative electrode material according to the first aspect of the present invention. However, the negative active material may further include the material that may be Intercalation lithium upon <2V (vs. Li/Li$^+$), specifically, the negative active material may further include one or more of mesocarbon microbeads (referred to as MCMB), hard carbon, soft carbon, silicon, silicon-carbon composites, Li—Sn alloy, Li—Sn—O alloy, Sn, SnO, $SnO_2$, lithium $TiO_2$—$Li_4Ti_5O_{12}$ with spinel structure, Li—Al alloy.

When the secondary battery is a sodium ion secondary battery or a zinc ion secondary battery, it is only necessary to change the corresponding positive active material, negative active material, and electrolyte salt.

The following further describes the present application in combination with embodiments. It should be understood that these embodiments are only used to illustrate the present application, but not for the limitation of the scope of the present application. Only the case where the secondary battery is a lithium ion secondary battery is shown in the embodiments, but the present invention is not limited thereto.

Embodiment 1

(1) Preparation of Modified Graphite Negative Electrode Material

A sheet-like graphene with a layer number of 10 and a true density of 2.1 g/cm$^3$ is added to a mechanical fusion machine, the rotation speed is set to be 600 r/min, and the rotation time is set to be 1.5 h, for shaping and granulation of the sheet-like graphene, to obtain a multilayer graphene with a regular morphology and a median diameter D50 of 14 μm.

A conductive carbon of black Super P™, a binder of asphalt and the above multilayer graphene are added to a vertical reactor of the mechanical fusion machine at a mass ratio of 15:10:75 under the protection of a nitrogen atmosphere, the heating temperature is set from 200° C. to 280° C., and the rotation speed is set to be 300 r/min, for surface modification of the multilayer graphene, to obtain the multilayer graphene loaded with Super P™ after the reaction (see FIG. 1 for the morphology).

A graphite and the multilayer graphene loaded with Super P™ are added to a V-type mixer at a mass ratio of 99.5:0.5 for mixing, and the rotation speed is set to be 400 r/min, for screening and demagnetizing after mixing, to obtain the modified graphite negative electrode material.

(2) Preparation of the Negative Electrode

The above-prepared modified graphite negative electrode material, a binder of styrene butadiene rubber (SBR), and a thickener of sodium carboxymethyl cellulose (CMC) are dissolved in a mass ratio of 97.5:1.5:1 into deionized water and mixed evenly to prepare a negative electrode slurry, which is then coated evenly onto a negative current collector of copper foil, and dried at 85° C. for cold pressing with a pressure of 2000 T (ton), then subjected to cutting, slicing, slitting, and welding with an electrode tab, to obtain the negative electrode, wherein the coating weight of the negative electrode slurry is 167 mg/1540.25 mm$^2$.

(3) Preparation of the Positive Electrode

A positive active material of lithium cobaltate, a conductive agent of Super P™, a binder of polyvinylidene fluoride (PVDF) are dissolved in N-methylpyrrolidone at a mass ratio of 96:2:2 and mixed evenly to prepare a positive electrode slurry, which is then coated evenly onto a positive current collector of aluminum foil, and dried at 85° C. for cold pressing, cutting, slicing, slitting, and welding with an electrode tab, to obtain the positive electrode, wherein the coating weight of the positive electrode slurry is 340 mg/1540.25 mm$^2$, and the compaction density of the positive electrode is 4.1 g/cm$^3$.

(4) Preparation of Electrolyte

The electrolyte adopts 1 M LiPF$_6$ as a lithium salt, and the organic solvent adopts EC/EMC=3:7 (volume ratio).

(5) Preparation of Lithium Ion Secondary Battery

The positive electrode, the negative electrode, and the separator (polypropylene microporous membrane having a thickness of 12 μm) are formed into a cell by a winding process, and then encapsulated with an aluminum plastic membrane and injected with an electrolyte, followed by being subjected to processes such as forming, capacity, and shaping, to complete the preparation of lithium ion secondary battery.

Embodiment 2

The preparation method of the lithium ion secondary battery is the same as that in Embodiment 1, except that:
(1) Preparation of Modified Graphite Negative Electrode Material
The number of layers of the sheet-like graphene is 15, and the true density is 2.09 g/cm$^3$.

Embodiment 3

The preparation method of the lithium ion secondary battery is the same as that in Embodiment 1, except that:
(1) Preparation of Modified Graphite Negative Electrode Material
The number of layers of the sheet-like graphene is 20, and the true density is 2.15 g/cm$^3$.

Embodiment 4

The preparation method of the lithium ion secondary battery is the same as that in Embodiment 1, except that:
(1) Preparation of Modified Graphite Negative Electrode Material
The mass ratio of graphite to the multilayer graphene loaded with Super P™ is 90:10.

Embodiment 5

The preparation method of the lithium ion secondary battery is the same as that in Embodiment 1, except that:
(1) Preparation of Modified Graphite Negative Electrode Material
The mass ratio of graphite to the multilayer graphene loaded with Super P™ is 85:15.

Embodiment 6

The preparation method of the lithium ion secondary battery is the same as that in Embodiment 1, except that:
(1) Preparation of Modified Graphite Negative Electrode Material
The mass ratio of Super P™, asphalt and the multilayer graphene is 10:5:85.

Embodiment 7

The preparation method of the lithium ion secondary battery is the same as that in Embodiment 1, except that:
(1) Preparation of Modified Graphite Negative Electrode Material
The mass ratio of Super P™, asphalt and the multilayer graphene is 40:40:20.

Embodiment 8

The preparation method of the lithium ion secondary battery is the same as that in Embodiment 1, except that:
(1) Preparation of Modified Graphite Negative Electrode Material
The multilayer graphene has a median diameter D50 of 6 μm.

Embodiment 9

The preparation method of the lithium ion secondary battery is the same as that in Embodiment 1, except that:
(1) Preparation of Modified Graphite Negative Electrode Material
The multilayer graphene has a median diameter D50 of 24 μm.

Embodiment 10

The preparation method of the lithium ion secondary battery is the same as that in Embodiment 1, except that:
(1) Preparation of Modified Graphite Negative Electrode Material
The conductive agent is selected from Ketjen Black™.
The binder is selected from polystyrene resin, and the heating temperature is controlled at 240° C. to 250° C.

Embodiment 11

The preparation method of the lithium ion secondary battery is the same as that in Embodiment 1, except that:
(1) Preparation of Modified Graphite Negative Electrode Material
The number of layers of the sheet-like graphene is 20, and the true density is 1.8 g/cm³.

Embodiment 12

The preparation method of the lithium ion secondary battery is the same as that in Embodiment 1, except that:
(1) Preparation of Modified Graphite Negative Electrode Material
The mass ratio of graphite to the multilayer graphene loaded with Super P™ is 80:20.

Embodiment 13

The preparation method of the lithium ion secondary battery is the same as that in Embodiment 1, except that:
(1) Preparation of Modified Graphite Negative Electrode Material
The mass ratio of Super P™, asphalt and the multilayer graphene is 5:5:90.

Embodiment 14

The preparation method of the lithium ion secondary battery is the same as that in Embodiment 1, except that:
(1) Preparation of Modified Graphite Negative Electrode Material
The mass ratio of Super P™, asphalt and the multilayer graphene is 45:45:10.

Embodiment 15

The preparation method of the lithium ion secondary battery is the same as that in Embodiment 1, except that:
(1) Preparation of Modified Graphite Negative Electrode Material
The multilayer graphene has a median diameter D50 of 3 μm.

Embodiment 16

The preparation method of the lithium ion secondary battery is the same as that in Embodiment 1, except that:
(1) Preparation of Modified Graphite Negative Electrode Material
The multilayer graphene has a median diameter D50 of 30 μm.

Embodiment 17

The preparation method of the lithium ion secondary battery is the same as that in Embodiment 1, except that:
(1) Preparation of Modified Graphite Negative Electrode Material
The mass ratio of graphite to the multilayer graphene loaded with Super P™ is 99.9:0.1.

Comparative Example 1

The preparation method of the lithium ion secondary battery is the same as that in Embodiment 1, except that:
The negative electrode material is selected from conventional artificial graphite without the addition of graphene.
The preparation process of the negative electrode is: an artificial graphite, a conductive agent of Super P™, a binder of styrene butadiene rubber (SBR), and a thickener of sodium carboxymethyl cellulose (CMC) are dissolved in deionized water at a mass ratio of 96.5:1:1.5:1 and mixed evenly to prepare a negative electrode slurry, which is then coated evenly onto a negative current collector of copper foil, and dried at 85° C. for cold pressing with a pressure of 2000 T, then subjected to cutting, slicing, slitting, and welding with an electrode tab, to obtain the negative electrode, wherein the coating weight of the negative electrode slurry is 167 mg/1540.25 mm².

Comparative Example 2

The preparation method of the lithium ion secondary battery is the same as that in Embodiment 1, except that:
(1) Preparation of Modified Graphite Negative Electrode Material
The modified graphite negative electrode material is obtained by simply mixing graphite with graphene.
Next, the test for the performance of the lithium ion secondary battery will be described.
(1) Test for Lithium Precipitation at Negative Electrode
The lithium ion secondary battery is charged to 4.35V with a constant current of 1.3 C at 25° C. and charged to a current of 0.05 C at a constant voltage, and then discharged to 3.0 V with a constant current of 1 C. The above is a charge and discharge cycle. After charging and discharging are repeated 10 times as described above, the lithium ion secondary battery is disassembled to observe the lithium precipitation at the negative electrode. Among which, the degree of lithium precipitation is divided into no lithium precipitation, slight lithium precipitation, moderate lithium precipitation and severe lithium precipitation. The slight lithium precipitation indicates that the lithium precipitation region on the surface of the negative electrode is 1/10 or less of the entire region, and the severe lithium precipitation indicates that the lithium precipitation region on the surface of the negative electrode exceeds 1/3 of the entire region.
(2) Test for the Cycle Performance of the Lithium Ion Secondary Battery
The lithium ion secondary battery is charged to 4.35V with a constant current of 1 C at 25° C. and charged to a current of 0.05 C at a constant voltage, and then discharged to 3.0 V with a constant current of 1 C. The above is a charge and discharge cycle. The charging and discharging are repeated as described above, and the capacity retention ratio after cycling the lithium ion secondary battery for 350 times is calculated.

TABLE 1

Parameters of Embodiments 1-17 and Comparative Examples 1-2.

| | multilayer graphene | | | | | | |
| --- | --- | --- | --- | --- | --- | --- | --- |
| | layer number | true density (g/cm³) | D50 (μm) | conductive agent | binder | conductive agent:binder:multilayer graphene | graphite:multilayer graphene |
| Embodiment 1 | 10 | 2.1 | 14 | Super P | asphalt | 15:10:75 | 99.5:0.5 |
| Embodiment 2 | 15 | 2.09 | 14 | Super P | asphalt | 15:10:75 | 99.5:0.5 |
| Embodiment 3 | 20 | 2.15 | 14 | Super P | asphalt | 15:10:75 | 99.5:0.5 |
| Embodiment 4 | 10 | 2.1 | 14 | Super P | asphalt | 15:10:75 | 90:10 |
| Embodiment 5 | 10 | 2.1 | 14 | Super P | asphalt | 15:10:75 | 85:15 |
| Embodiment 6 | 10 | 2.1 | 14 | Super P | asphalt | 10:5:85 | 99.5:0.5 |
| Embodiment 7 | 10 | 2.1 | 14 | Super P | asphalt | 40:40:20 | 99.5:0.5 |
| Embodiment 8 | 10 | 2.1 | 6 | Super P | asphalt | 15:10:75 | 99.5:0.5 |
| Embodiment 9 | 10 | 2.1 | 24 | Super P | asphalt | 15:10:75 | 99.5:0.5 |
| Embodiment 10 | 10 | 2.1 | 14 | Ketjen black | polystyrene resin | 15:10:75 | 99.5:0.5 |
| Embodiment 11 | 20 | 1.8 | 14 | Super P | asphalt | 15:10:75 | 99.5:0.5 |
| Embodiment 12 | 10 | 2.1 | 14 | Super P | asphalt | 15:10:75 | 80:20 |
| Embodiment 13 | 10 | 2.1 | 14 | Super P | asphalt | 5:5:90 | 99.5:0.5 |
| Embodiment 14 | 10 | 2.1 | 14 | Super P | asphalt | 45:45:10 | 99.5:0.5 |
| Embodiment 15 | 10 | 2.1 | 3 | Super P | asphalt | 15:10:75 | 99.5:0.5 |
| Embodiment 16 | 10 | 2.1 | 30 | Super P | asphalt | 15:10:75 | 99.5:0.5 |
| Embodiment 17 | 10 | 2.1 | 14 | Super P | asphalt | 15:10:75 | 99.9:0.1 |
| Comparative Example 1 | / | / | / | Super P | asphalt | / | / |
| Comparative Example 2 | 10 | 2.1 | 14 | Super P | asphalt | / | 99.5:0.5 |

TABLE 2

Results of performance test for Embodiments 1-17 and Comparative Examples 1-2

| | compaction density at negative electrode (g/cm³) | lithium precipitation at negative electrode | capacity retention rate after 350 cycles |
| --- | --- | --- | --- |
| Embodiment 1 | 1.819 | no lithium precipitation | 94.0% |
| Embodiment 2 | 1.831 | no lithium precipitation | 94.0% |
| Embodiment 3 | 1.829 | slight lithium precipitation | 93.8% |
| Embodiment 4 | 1.813 | no lithium precipitation | 94.3% |
| Embodiment 5 | 1.807 | no lithium precipitation | 94.7% |
| Embodiment 6 | 1.809 | slight lithium precipitation | 94.0% |
| Embodiment 7 | 1.801 | slight lithium precipitation | 93.7% |
| Embodiment 8 | 1.820 | no lithium precipitation | 94.0% |
| Embodiment 9 | 1.818 | no lithium precipitation | 94.1% |
| Embodiment 10 | 1.828 | slight lithium precipitation | 94.3% |
| Embodiment 11 | 1.801 | slight lithium precipitation | 94.1% |
| Embodiment 12 | 1.751 | moderate lithium precipitation | 92.5% |
| Embodiment 13 | 1.753 | severe lithium precipitation | 92.7% |
| Embodiment 14 | 1.76 | moderate lithium precipitation | 92.6% |
| Embodiment 15 | 1.751 | severe lithium precipitation | 92.0% |
| Embodiment 16 | 1.780 | moderate lithium precipitation | 92.3% |
| Embodiment 17 | 1.800 | no lithium precipitation | 94.0% |
| Comparative Example 1 | 1.751 | severe lithium precipitation | 92.0% |
| Comparative Example 2 | 1.755 | moderate lithium precipitation | 92.0% |

TABLE 3 compaction density at negative electrode under different cold pressing pressure of Embodiment 1 and Comparative Example 1 (g/cm³)

| | Cold pressing pressure (T) | | | | |
| --- | --- | --- | --- | --- | --- |
| | 500 | 750 | 1000 | 1500 | 2000 |
| Comparative Example 1 | 1.443 | 1.519 | 1.593 | 1.677 | 1.751 |
| Embodiment 1 | 1.455 | 1.563 | 1.648 | 1.743 | 1.819 |

As can be seen from Table 3, the compaction density of the negative electrode of Embodiment 1 is remarkably improved as compared with Comparative Example 1 using only conventional graphite as the negative electrode material.

Figure 4:
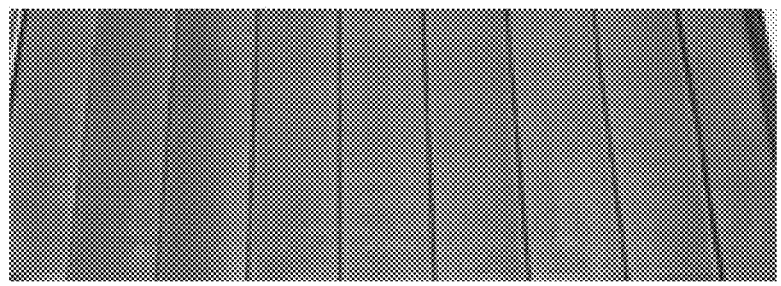
FIG. 4 shows lithium precipitation of the negative electrode of Comparative Example 1.
Figure 5:
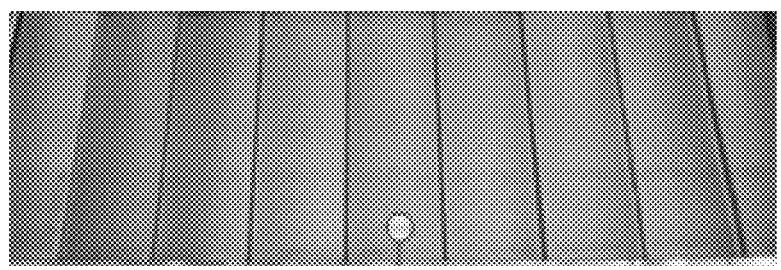
FIG. 5 shows lithium precipitation of the negative electrode of Embodiment 1.

As can be seen from FIGS. 4 and 5, the negative electrode of Comparative Example 1 shows severe lithium precipitation, and the negative electrode of Embodiment 1 does not exhibit lithium precipitation.

As can be seen from Table 1, the capacity retention rate after the 350 cycles of the lithium ion secondary battery of Comparative Example 1 is only 92%, and the capacity retention rate after the 350 cycles of the lithium ion secondary battery of Embodiment 1 is as high as 94%, which significantly extends the life of lithium ion secondary battery.

Figure 2:
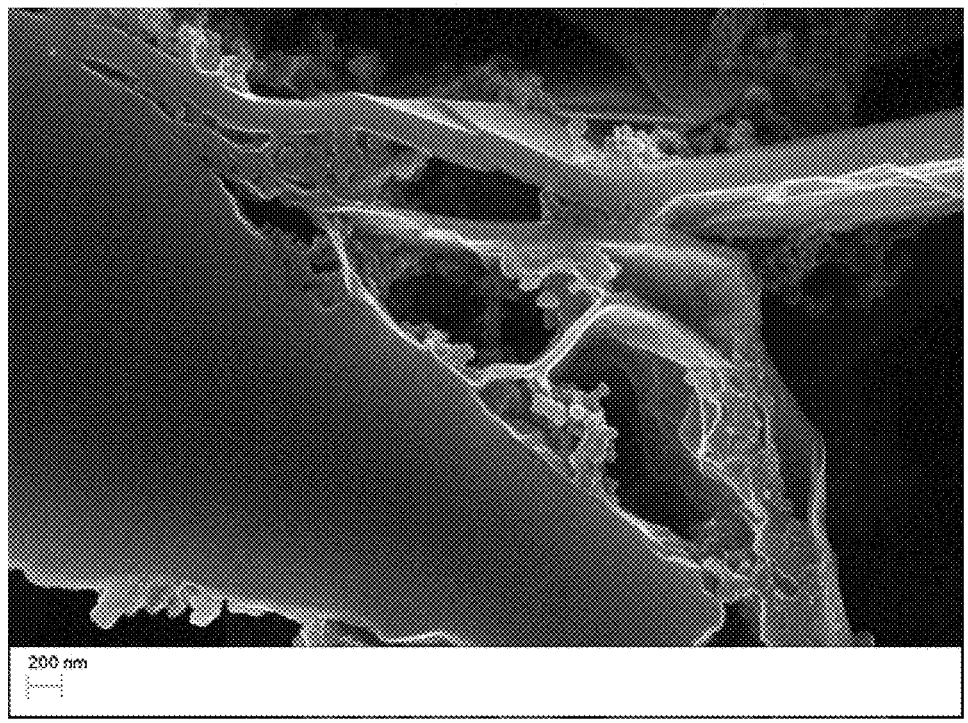
FIG. 2 is an SEM graph of the modified graphite negative electrode material prepared in Embodiment 1.
Figure 3:
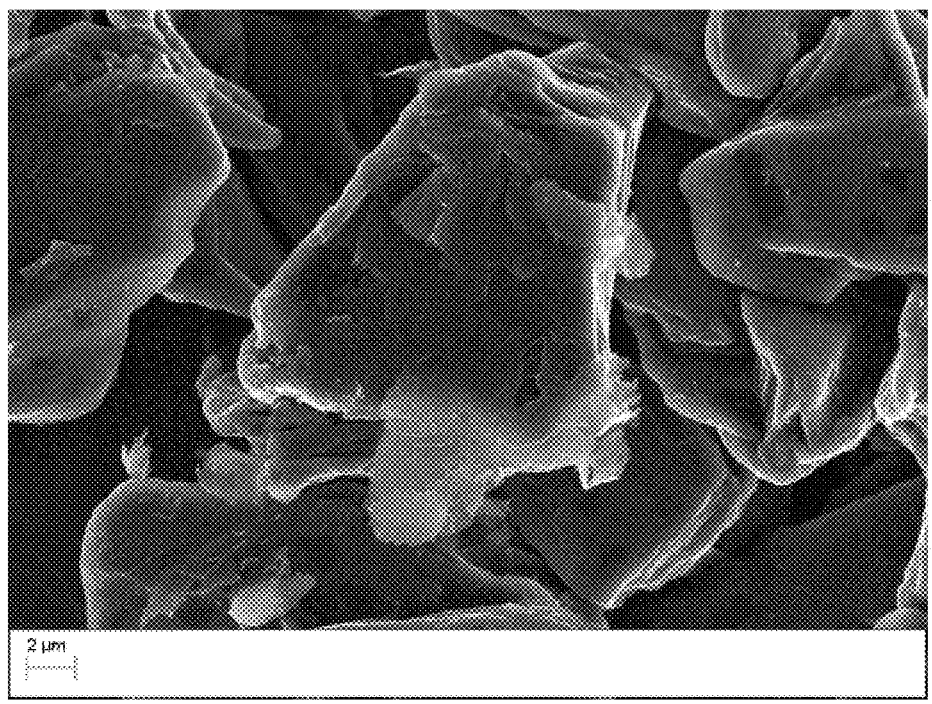
FIG. 3 is an SEM graph of the modified graphite negative electrode material prepared in Comparative Example 2.

FIG. 1 is a FESEM graph of a multilayer graphene loaded with Super P™ prepared in Embodiment 1. FIG. 2 is an SEM graph of the modified graphite negative electrode material prepared in Embodiment 1. FIG. 3 is an SEM graph of the modified graphite negative electrode material prepared in Comparative Example 2. It can be seen from FIG. 3 that the graphene has agglomeration in the graphite particles, and the distribution is not uniform, which leads to poor electrolyte infiltration of the negative electrode, low compaction density of the negative electrode, being easy to produce lithium precipitation, and a poor cycle performance of the lithium ion secondary battery. As can be seen from FIG. 2, the multilayer graphene loaded with the conductive agent may be relatively uniformly dispersed in the graphite particles, so that a conductive network structure is formed. It can also be seen from FIG. 1 that the conductive agent is also uniformly dispersed on the multilayer graphene, which improves the processing property of the multilayer graphene and is advantageous for improving conductivity and electrolyte infiltration.

Further, as can be seen from Table 2, in Embodiments 1-11 and 17, the lithium ion secondary battery using the modified graphite negative electrode material of the present application has a significant improvement in the compaction density of the negative electrode, the lithium precipitation of the negative electrode, and the cycle performance. Without significantly reducing the compaction density of the negative electrode of the lithium ion secondary battery, the lithium precipitation of the negative electrode, and the cycle performance, Embodiments 12-16 may still have an effect of improving the compaction density of the negative electrode of the lithium ion secondary battery, the lithium precipitation of the negative electrode, and the cycle performance.

What is claimed is:

1. A method for preparing a modified graphite negative electrode material, comprising steps of:
    adding a multilayer graphene, a conductive agent and a binder to a reactor of a mechanical fusion machine under a protective gas atmosphere, setting a rotation speed and raising the temperature so that the multilayer graphene are loaded with the conductive agent by the bonding of the binder;
    adding the multilayer graphene loaded with the conductive agent and the graphite to a mixer for mixing, screening and demagnetizing after mixing, to obtain the modified graphite negative electrode material,
    wherein the modified graphite negative electrode material comprises: a graphite; and
    a multilayer graphene dispersed in the graphite;
    wherein,
    the multilayer graphene are loaded with a conductive agent by bonding of a binder, and
    wherein the multilayer graphene has a true density of 1.8 g/cm$^3$ to 2.15 g/cm$^3$.

2. The method according to claim 1, wherein the multilayer graphene has a layer number of 10 to 20.

3. The method according to claim 2, wherein the multilayer graphene has a layer number of 10 to 15.

4. The method according to claim 1, wherein the conductive agent includes one or more of a carbon black conductive agent and a graphite conductive agent.

5. The method according to claim 1, wherein the binder is selected from one or more of asphalt, phenolic resin, polyurethane, polystyrene resin, polyacrylate, and ethylene-vinyl acetate copolymer.

6. The method according to claim 1, wherein,
    a mass ratio of the graphite to the multilayer graphene is: (85% to 99.9%):(0.1% to 15%); a mass ratio of the conductive agent to the binder to the multilayer graphene is: (10% to 40%):(5% to 40%):(20% to 85%).

7. The method according to claim 1, wherein the multilayer graphene have a median diameter D50 of 6 μm to 24 μm.

8. A method of forming a secondary battery, comprising:
    forming a positive electrode,
    forming an electrolyte,
    forming a negative electrode, and
    forming the secondary battery,
    wherein,
    forming the negative electrode comprising preparing the negative electrode by the method of preparing the modified graphite negative electrode material according to claim 1.

9. The method according to claim 8, wherein the multilayer graphene has a layer number of 10 to 20.

10. The method according to claim 9, wherein the multilayer graphene has a layer number of 10 to 15.

11. The method according to claim 8, wherein the conductive agent includes one or more of a carbon black conductive agent and a graphite conductive agent.

12. The method according to claim 8, wherein the binder is selected from one or more of asphalt, phenolic resin, polyurethane, polystyrene resin, polyacrylate, and ethylene-vinyl acetate copolymer.

13. The method according to claim 8, wherein,
    a mass ratio of the graphite to the multilayer graphene is: (85% to 99.9%):(0.1% to 15%); a mass ratio of the conductive agent to the binder to the multilayer graphene is: (10% to 40%):(5% to 40%):(20% to 85%).

14. The method according to claim 8, wherein the multilayer graphene have a median diameter D50 of 6 μm to 24 μm.

* * * * *